United States Patent Office

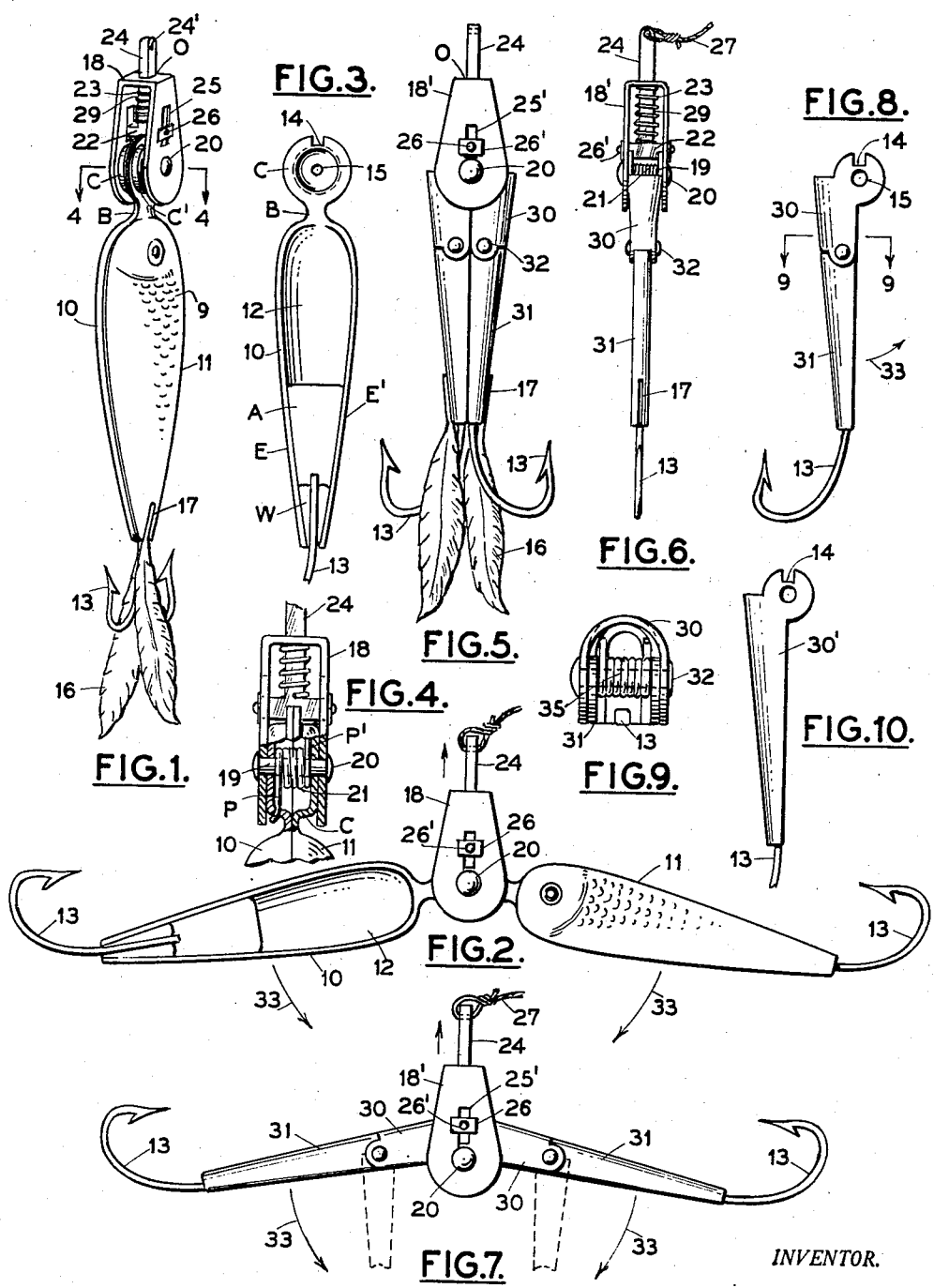

2,833,076
Patented May 6, 1958

2,833,076

FISH HOOK ASSEMBLY

Mario Corradi, New York, N. Y.

Application October 12, 1955, Serial No. 539,969

4 Claims. (Cl. 43—36)

This invention relates to the art of fishing tackle and particularly concerns an expandable fish hook assembly.

It is a principal object of the invention to provide a fish hook assembly, having arms which expand automatically upon application of a predetermined tension on an attached fishing line.

It is a further object to provide a fish hook assembly having a pair of retractable arms held by a latching mechanism and releasable to expand automatically when the latching mechanism is operated.

It is a further object to provide an expandable fish hook assembly which also serves as a line and sinker.

It is a further object to provide an expandable fish hook assembly with articulated arms.

It is a further object to provide an automatically expandable fish hook assembly with a spring actuated mechanism including a pair of springs, one of which springs biases a pair of arms for outward movement and the other spring insures retention of the arms in a retracted position until the latch mechanism is actuated.

Other and further objects and advantages of the invention will become apparent from the following detailed description taken together with the drawing, wherein:

Fig. 1 is an isometric view of a fish hook assembly according to the invention.

Fig. 2 shows the assembly in expanded configuration.

Fig. 3 is an interior elevational view of one arm of the assembly.

Fig. 4 is a sectional view taken on lines 4—4 of Fig. 1.

Fig. 5 shows a front view of a modification of the invention employing articulated arms.

Fig. 6 is a side view of the assembly of Fig. 5.

Fig. 7 shows the assembly of Fig. 5 with arms extended.

Fig. 8 shows one form of arms used in the assembly of Fig. 5.

Fig. 9 is a sectional view taken on lines 9—9 of Fig. 8.

Fig. 10 shows another form of arms usable in the assembly of Fig. 3.

In Figs. 1, 2 are shown a pair of overlapping tapered juxtaposed arms 10, 11. Each arm has an elongated concave, hollow or shell-like portion or section shown best in Fig. 3. This arm may be formed by embossing or pressing a tapered strip of metal. In the cavity of the tapered portion 12 may be secured a weight A made of lead or other heavy material. In the narrow end of section 12 is secured a fish hook 13 by solder or weld W. The hook is disposed substantially coplanar with the edges E, E' of section 12. At the wider end of the arm is a neck section B which terminates in a cup-like section C. At the end of the arm is a slot 14. An aperture 15 is located in the center of section C. Both arms 10 and 11 are identical and are juxtaposed with the convex sides outward to define a tapered structure resembling a fish body. One or more feathers or quills 16 may be inserted in slots 17 at the narrow ends of the sections 12 to conceal the hooks 13. The points of the hooks are disposed laterally and substantially coplanar of the body of the assembly. A tapered U-shaped latch head 18 is provided with a pintle 19 having end heads 20. The pin joins the free ends of the head 18. The arms 10, 11 are pivotally mounted on pintle 19 which passes through apertures 15. This pintle as shown best in Fig. 4 carries a coil spring 21. One end P of the spring bears on the inner side of cup section C of one arm. The other end P' of the spring bears on the inner side of the facing cup section C. The spring is biased to cause the arms 10, 11 to pivot outwardly on pintle 19 as shown in Fig. 2 so as to separate the hooks 13 to a maximum extent, in substantially a single plane.

A latching mechanism normally prevents this expansion of the arms. The latching mechanism includes an inverted T-shaped bar 29. Cross-piece 22 of the T-bar fits into the registering slots 14 of cup-sections C, C'. A coil spring 23 is mounted on the shaft 24 of the T-bar within head 18 and is biased to hold the cross-piece in the slots 14 with a predetermined force. The end of the shaft extends through an aperture O in the top of head 18 and is slidable therein. Slots 25 are provided in the sides of the head and pins 26 extend from the ends of cross piece 22 through these slots to guide the cross-piece in its movement. A fishing line 27 may be attached to shaft 24 which is provided with an aperture 24' for this purpose. When the line is slack and the arms are retracted to the position shown in Fig. 1, the cross-piece inserted in slots 14 prevents expansion of the arms and the coil spring 23 prevents dislodging of the cross-piece from the slots. When the line is pulled with a predetermined force such as will be encountered by catching of a fish on a hook 13, the cross-piece will be pulled clear of slots 14, and the arms will instantly expand in scissor-like fashion as shown in Fig. 2. No matter how wide may be the mouth of the fish the oppositely disposed hooks will engage the sides thereof to hold the fish securely.

In Figs. 5-9 are shown a modification of the invention having arms in side by side juxtaposition. Each arm of the assembly includes a hollow upper portion 30 having a U-shaped cross section tapered longitudinally. A correspondingly tapered hollow lower section 31 is joined to section 30 by a pintle 32 carrying coil spring 35. The spring is biased to hold the sections 30, 31 in alignment. Section 31 can pivot inwardly only as shown by arrow 33 in a direction opposite to that in which hook 13 is directed. The hooks 13 are suitably secured by soldering or otherwise to the narrow ends of sections 31. Slots 17 in the ends of sections 31 provide means for securing a quill or feather 16 therein. It will be noted that the arms are disposed side by side and do not overlap in the manner of the embodiment of Figs. 1-4. The articulation feature of the arm is shown omitted in the modification of the arm illustrated in Fig. 8. In this latter embodiment tapered section 30' has a length equal to the combined lengths of sections 30 and 31. At the upper ends of sections 30, 30' there are slots 14 into which fit cross-piece 22 of the T-bar 29 to hold the arms in side by side relationship as shown in Fig. 5. Head 18' is U-shaped and may be tapered in form. If the slots 25' are wider than slots 25 in Fig. 1 heads 26' are provided on pins 26 to insure that the cross piece 22 is effectively guided in movement.

In Fig. 7 is shown the configuration assumed by the arms when line 27 is pulled. The arms expand to locate the hooks 13 coplanarly at extreme outward positions which may be as much as 180 degrees apart. Springs 35 are biased to hold the sections 31 in alignment with their respective supporting sections 30. The articulated or hinged movement of the arm sections is indicated by dotted lines in Fig. 7. This articulation of the several sections adapts the assembly automatically to different sizes of mouths of fish which may be caught on the hooks. Lead weights may be inserted in section 30, 31 and arms 30' in a manner similar to weight A in Fig. 3.

A particularly important feature of the invention is the certainty that the latching mechanism cannot be triggered open unless a fish is caught. Whenever the assembly is thrown or lowered into water or is used in trolling or casting some tension will necessarily be exerted on line 27. The tension in spring 23 is so adjusted that only the extreme tension encountered when a fish is actually caught will be sufficient to actuate the latching mechanism and expand the arms.

Another important feature of the invention is the adaptability of the arms and latch head to be so shaped that the entire assembly very realistically resembles a fish. The surfaces 9 of the arms as shown in Figs. 1 and 2 may be corrugated to simulate fish scales. These features improve the effectiveness of the assembly as a lure.

The assembly is specially adapted to mass production manufacture. The several arms may be pressed or cast by conventional methods. Since the two arms of the assembly are identical manufacturing costs are minimized. Only one set of dies or molds are required for fabricating the mating arms. The assembly is very rugged in structure by reason of the embossed or channel forms of the arms and is reliable in operation because of the simplified mechanism. If desired the arm sections 12 of Figs. 1–5 and the arm sections 30, 30' and 31 of Figs. 5–10 may be cast solid instead of in shell-like or U-shaped cross-sectional form.

Although only a limited number of embodiments of the invention have been disclosed it will be apparent to those skilled in the art that many modifications are possible. It is desired to obtain patent protection for the invention and all equivalents as fall within the scope of the appended claims.

What is claimed and desired to protect by Letters Patent of the United States is:

1. A fish hook assembly, comprising a latch head, a pair of tapered arms pivotally carried by said head, said arms being pivotable only under tension of a first spring carried by said head, each of said arms having an inner section and an outer section pivotally joined to each other and held in alignment by a second spring, a hook rigidly attached to the free end of each of said outer sections, and a latch means including another spring arranged to retain said arms in a retracted position under predetermined tension in said other spring.

2. A fish hook assembly, comprising a latch head, a pair of arms pivotally carried by said head, a first spring carried by said head for pivoting said arms under a first spring tension, and a latch means for retaining said arms in a retracted position under a second spring tension, said latch means comprising a T-bar having a shaft and cross piece slidable in said latch head, a second spring disposed on said shaft and providing said second spring tension, said cross piece being disposed to fit into slots at one end of each of said arms, said shaft being adapted to retain a fishing line thereon, said latch means releasing said arms upon application of at least predetermined force to the shaft to overcome said second spring tension whereby said arms are pivotally extended under tension of said first spring.

3. A fish hook assembly, comprising a latch head, a pair of arms pivotally carried by said head, a first spring carried by said head for pivoting said arms under a first spring tension, and a latch retaining said arms in a retracted position, said latch comprising a shaft slidable in said latch head, a second spring disposed in said head and mounted to oppose by a second spring tension movement of said shaft, said shaft being adapted to retain a fishing line thereon, said latch being actuated to release said arms upon application of at least a predetermined outwardly directed force to said shaft to overcome said second spring tension whereby said arms are pivotally extended under said first spring tension.

4. A fish hook assembly, comprising a latch head, a pair of tapered arms pivotally carried by said head, a first spring means carried by said head for pivoting said arms under a first spring tension, and a latch means including a second spring for retaining said arms in a retracted position under a second spring tension, said latch means comprising a T-bar having a shaft and cross piece slidable in said latch head, said second spring being disposed on said shaft, said cross piece being disposed to fit into slots at one end of each of said arms, said shaft being adapted to retain a fishing line thereon, each of said arms including a pair of pivotally joined sections held in alignment and pivotable under a third spring tension provided by another spring carried by each of said arms.

References Cited in the file of this patent

UNITED STATES PATENTS

| D. 167,154 | Lacy | July 1, 1952 |
| 1,217,769 | Jacobs | Feb. 27, 1917 |
| 2,442,866 | Stein | June 8, 1948 |
| 2,643,479 | Stevenson | June 30, 1953 |
| 2,696,060 | Mayer | Dec. 7, 1954 |

FOREIGN PATENTS

| 77,507 | Norway | Aug. 20, 1951 |
| 94,507 | Switzerland | Aug. 20, 1951 |